Patented Apr. 8, 1930

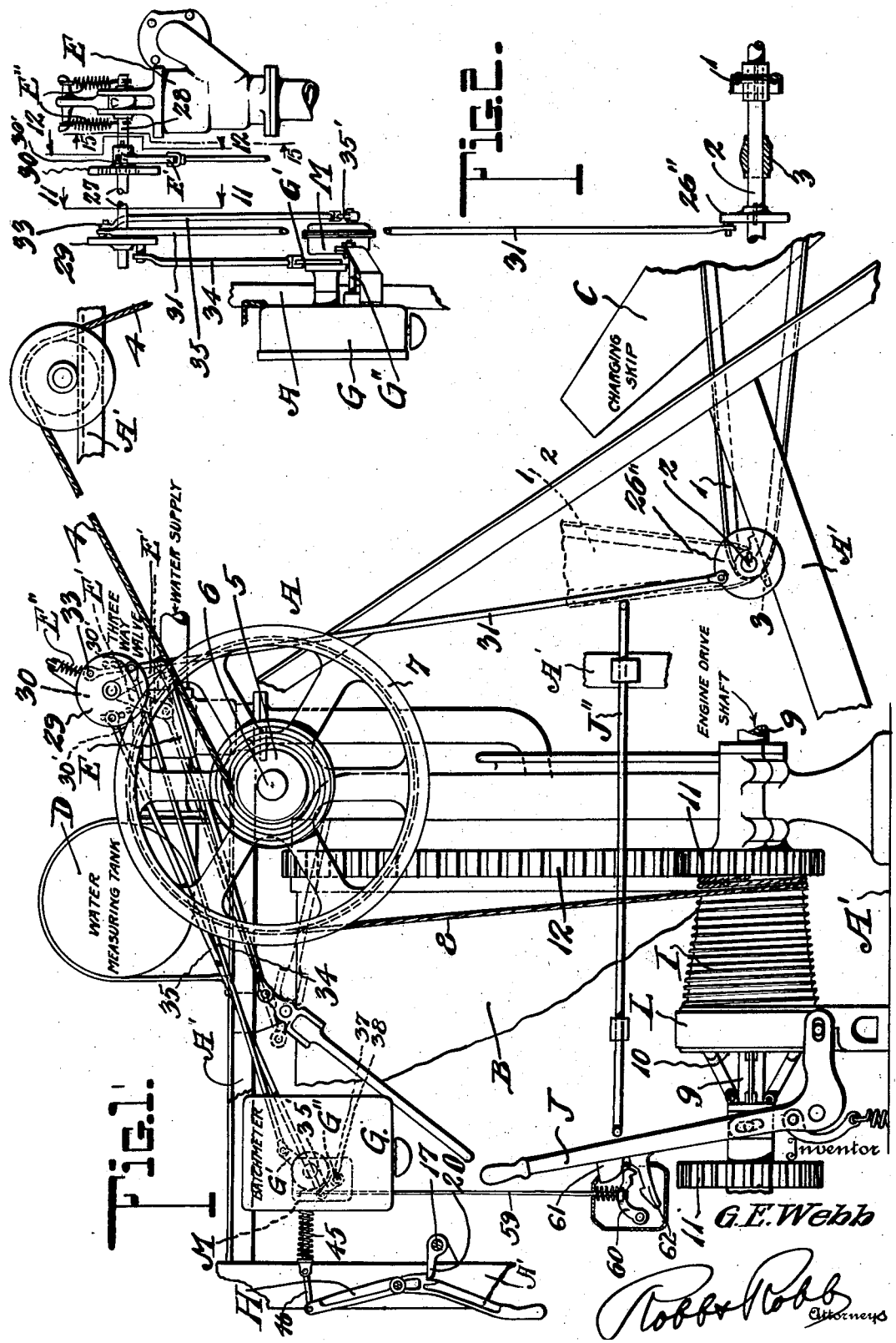

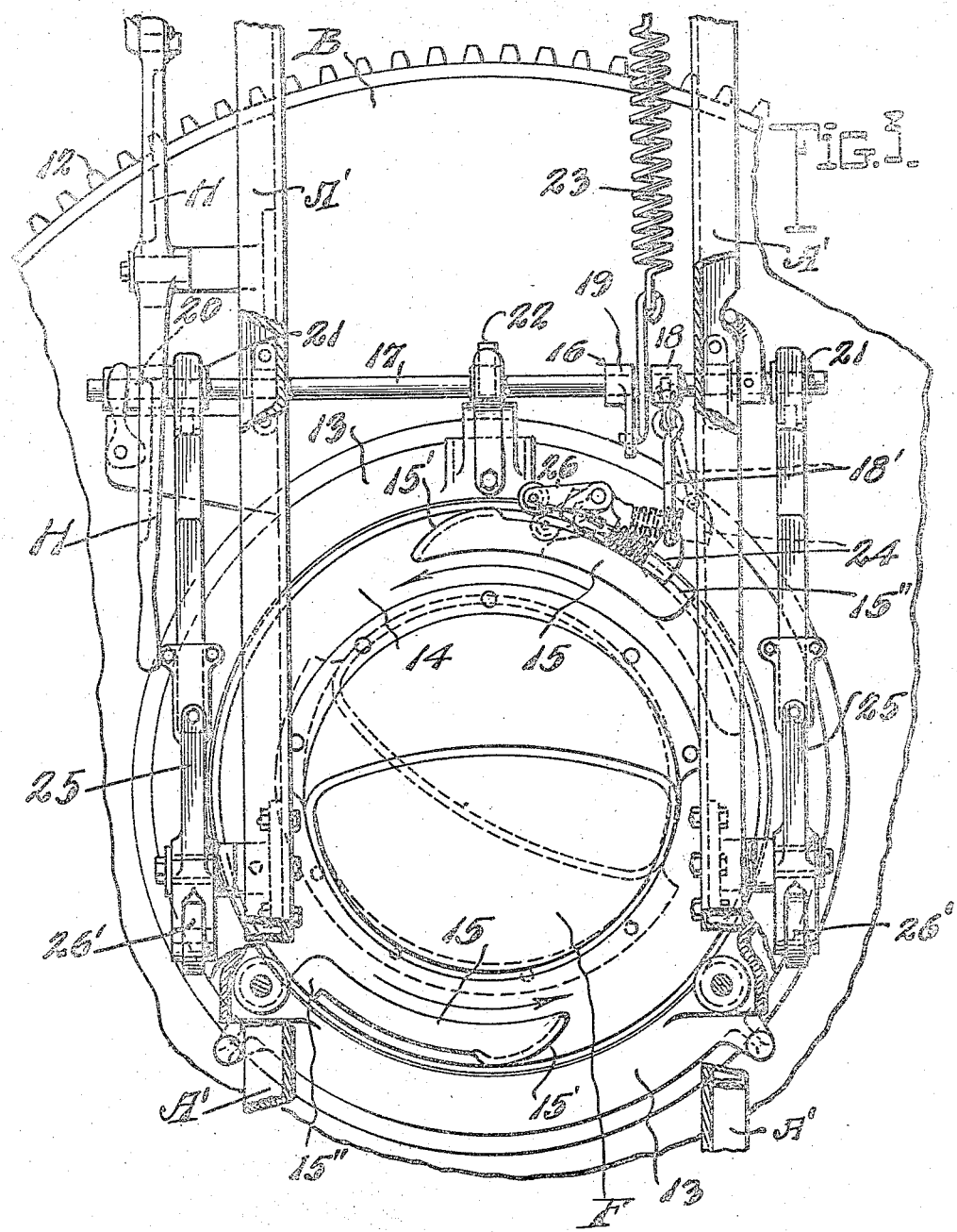

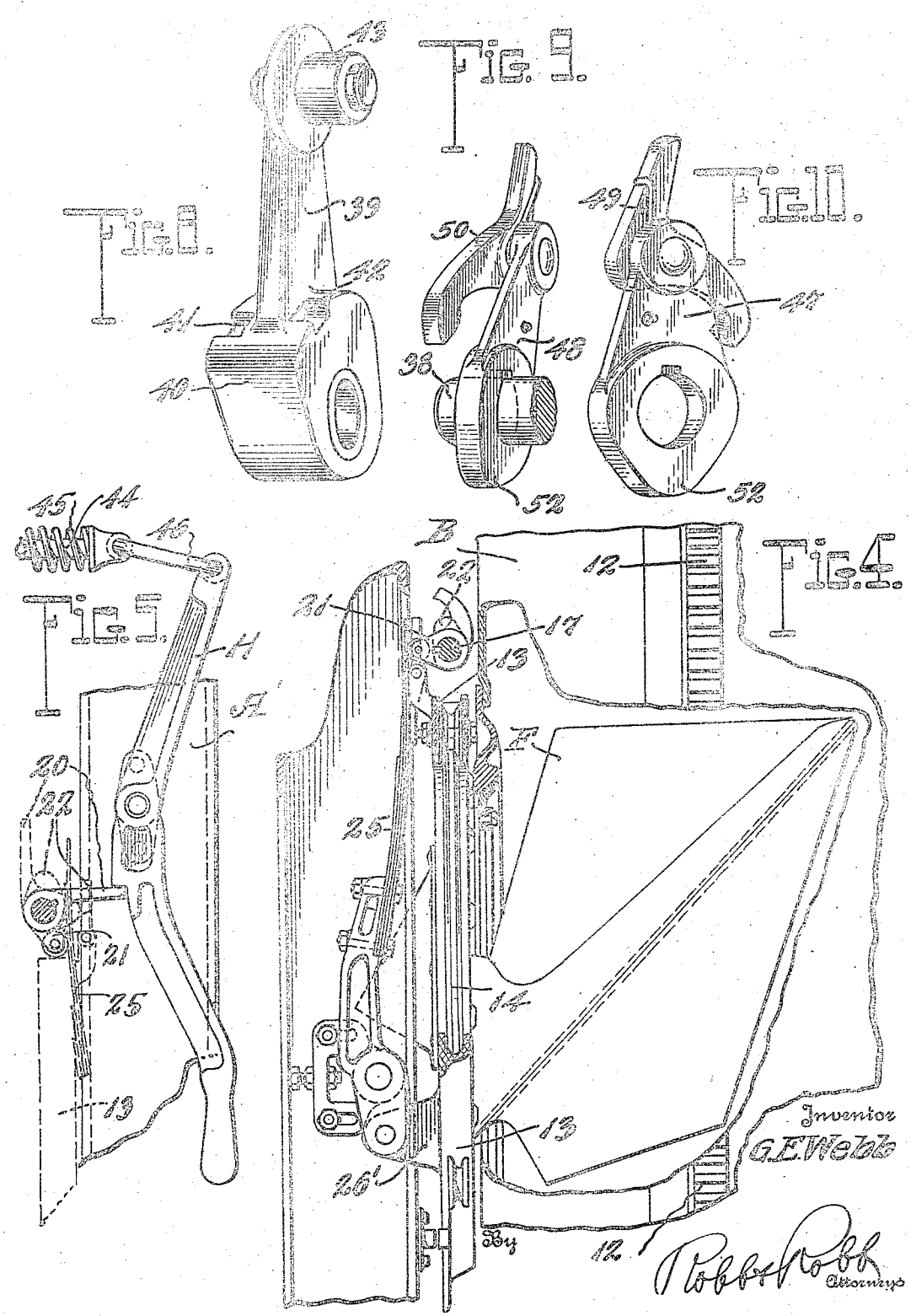

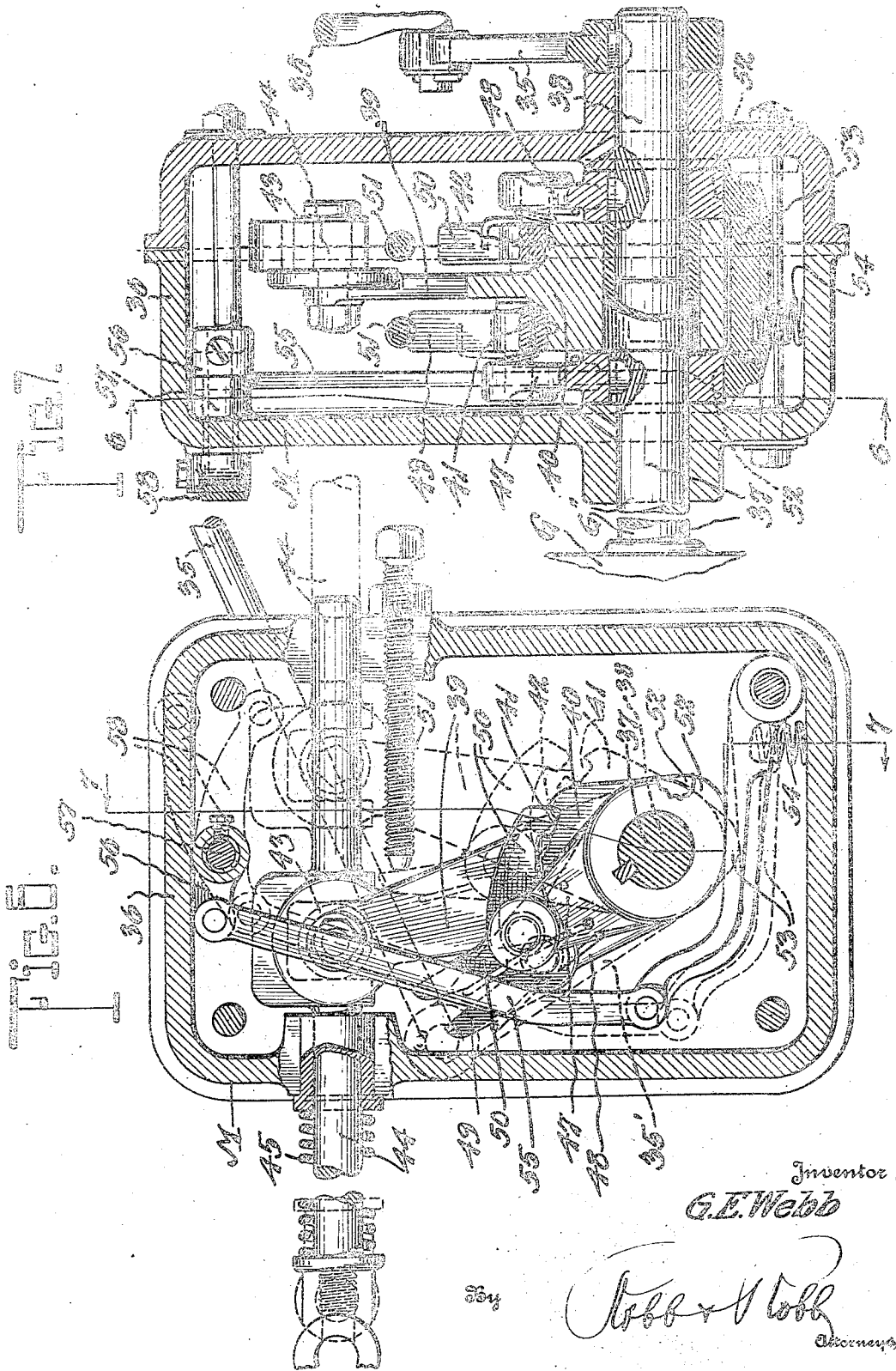

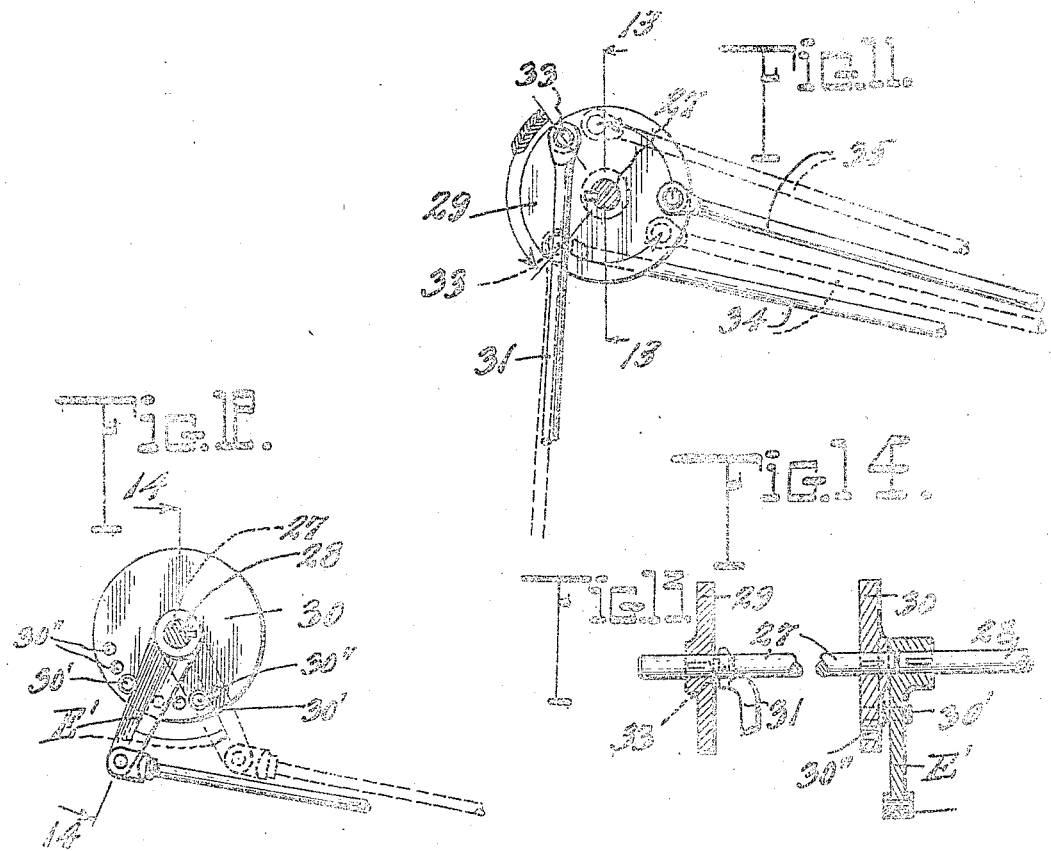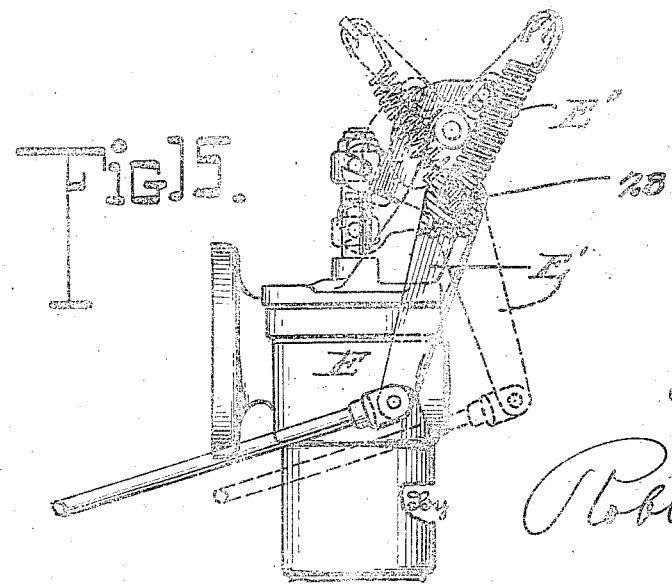

1,753,324

UNITED STATES PATENT OFFICE

GEORGE EVANS WEBB, OF MILWAUKEE, WISCONSIN, ASSIGNOR TO KOEHRING COMPANY, OF MILWAUKEE, WISCONSIN, A CORPORATION

AUTOMATIC CONCRETE-MIXING MACHINE

Application filed August 13, 1928. Serial No. 299,318.

The trend of certain modern developments in mixing machines of the paver type commonly availed of in concrete road construction is directed to the objective of attaining efficiency of operation to the utmost possible degree, and this invention is directed to improvements along these lines, namely, to devices which impart to a paving machine features of efficient operation.

A paving machine of this type from which the automatic phases of operation are absent, is disclosed in the patent to Lichtenberg, No. 1,141,470. A machine made in accordance with this invention will be characterized by its similarity of operation to the Robb Patents Nos. 1,370,497 and 1,328,765, inasmuch as the operations requisite to carrying out the mixing action automatically flow from the initiating of hoisting action of the skip which is locked against inopportune operation as in the last mentioned patent. It is obvious that such a machine is susceptible of efficient operation by comparatively unskilled operators and will function with extreme precision to produce a maximum output of concrete of uniform quality. The overlapping of the actions of the charging and discharging means is rendered automatic much the same as in the Robb Patent 1,660,301.

The invention also contemplates the provision of the means which renders automatic the initiation of upward movement of the charging means in an adjustable manner so that it may be rendered inoperative when desired. Under such conditions the series of automatic cycles would be started manually much as in the Robb Patent 1,370,497. It is notable that it is immaterial just where the cycle of operation of a machine of this character is said to commence. For the purpose of this specification, I have indicated a cycle as starting with the hoisting of the loading skip. However, it is readily appreciable that one might say the cycle commences with the throwing of the discharge or in fact at any other place in the operation of the machine.

Various other more detailed objects and advantages, as will arise with the designing of practical instrumentalities for carrying out my ideas, will in part become apparent and in part be hereinafter stated as the description of the invention proceeds.

For a full and more complete understanding thereof, reference may be had to the following description and accompanying drawings, in which Figure 1 is a diagrammatic side elevation of a portion of a concrete paving machine disclosing my invention applied thereto.

Figure 2 is a front elevation of certain of the parts as shown in Figure 1.

Figure 3 is a fragmentary front elevation of a portion of a concrete mixing drum and supporting frame provided with a power operated rotary discharge chute.

Figure 4 is a side elevation, partly in section, of certain of the parts as shown in Figure 3.

Figure 5 is a detailed view of the rotary chute control lever and certain of its associated parts.

Figure 6 is an enlarged detail sectional view of the discharge chute control mechanism taken on the line 6—6 of Figure 7.

Figure 7 is a vertical sectional view taken approximately on the line 7—7 of Figure 6.

Figure 8 is a detail perspective view of the actuating lever of the discharge chute control mechanism.

Figure 9 is a detail perspective view of one of the actuating elements for the control lever.

Figure 10 is a detail perspective view of the other actuating element.

Figure 11 is a detail view on the line 11—11 of Figure 2.

Figure 12 is a view on the line 12—12 of Figure 2.

Figure 13 is a view on the line 13—13 of Figure 11.

Figure 14 is a view on the line 14—14 of Figure 12.

Figure 15 is an enlarged fragmentary view on the line 15—15 of Figure 2.

Referring to the drawings, A denotes a concrete paving machine generally, which includes a mixing drum B adapted to be charged with aggregates by a charging skip C. Mixing water is supplied to the drum by the usual water measuring tank D and its associated three-way control valve E. Discharge chute F is provided for emptying the drum after the contents thereof have been thoroughly and properly mixed. G denotes the batchmeter or mixing period control device, while H indicates the discharge chute control lever.

The skip C is elevated by the skip hoist drum I rotation of which is manually by the skip hoist control lever J. It is lowered also under manual control by the same lever and the associated brake means L.

Cooperating with the discharge chute F, the three-way valve E, charging skip C, and time control device G is a device indicated generally at M for automatically controlling certain mechanical functions of the mixer and forming a part of my invention. All of the above mechanisms and devices are suitably supported by the frame structure A' of the paving machine A.

The charging skip C has projecting therefrom supporting brackets or arms 1 to the extremities of which are secured the cross shaft 2, which is journaled in suitable bearings 3 on the frame A' of the paver. Elevation and charging action of the skip are accomplished through the elevating cable 4 leading from the skip over certain frame supported pulleys to the small winding drums 5, keyed to the upper cross shaft 6 which also has keyed thereto the large winding drum 7, around which is wound the hoist cable 8. The free end of this cable leads down and is secured to the skip hoist drum I.

An engine, not shown, operates through proper reduction gearing, also not shown, to rotate the drive shaft 9 upon which is loosely journaled the skip hoist drum I. In order to establish driving relation between the shaft 9 and the skip hoist drum I to cause winding action thereof and skip elevation, a clutch 10 is provided. This clutch is engaged by the manual control lever J.

The skip hoist drum has associated therewith, brake means L, designed to normally prevent unwinding action of the drum I and consequent lowering movement of the skip. The skip hoist control lever J is cooperatively connected to both the clutch 10 and the brake means L so that when the lever is shifted to one position it releases the brake means and engages the clutch, while when shifted to the other position, it permits automatic brake application and clutch disengagement. Partial movement to the first position releases the brake without engagement of the clutch. A knock-out device for disengaging the clutch 10 when the skip reaches its upper limit is indicated at J''', and consists of a rod which is longitudinally movable when engaged by the bracket 1 of the skip to move the control lever J to its clutch disengaging position. The shaft 9 also has keyed thereto the pinions 11 which establish driving relation between the mixing drum and the said shaft. The discharging means for the mixing drum as disclosed in this case comprises the rotary chute F adapted to be forced against the discharge face of the mixing drum B, to be frictionally engaged and rotated thereby from the non-discharging position to the discharging position, and vice-versa, as shown in Figures 3 and 4.

As the chute reaches either of these positions, it is automatically disengaged from its frictional contact with the rotating face of the mixing drum and latched in position. Suitably journaled for free rotation in a shiftable swing ring frame 13 is the discharge chute annular centrally flanged supporting ring 14. This ring carries on its outer face two diametrically oppositely located cam face stop lugs 15. The purpose of these lugs 15 is to reset the release mechanism 16 and prevent further rotation of the chute carrying ring 14.

The release mechanism 16 includes a cross shaft 17 having projecting therefrom arms 18, 19, 20, and the three cams 21, 21, and 22. An actuating spring 23 is connected to the arm 19, normally tending to move the shaft 17 which would cause the arm 18 to lift the cushioned stop member 24 to cause release of the cam lug 15.

The discharge chute control lever H is adapted to normally engage the arm 20 to prevent the spring 23 from rotating the shaft 17. When, however, the control lever H is moved to release the arm 20, the spring 23 will cause the shaft 17 to be partially rotated lifting the stop 24 to permit the discharge chute to rotate. The cams 21 rock the upper portions of the centrally pivoted spring levers 25 away from the face of the mixing drum and the lower ends of the spring levers will be moved inwardly toward the mixing drum. Since the lower portions of the levers 25 are pivoted to ears 26' projecting from the ring frame 13, the rotary discharge chute will be caused to move inward and frictionally engage the drum face to be rotated thereby.

With the upward swinging movement of the stop 24, the restoring lever 26 and its associated roller will be moved downwardly into the path of the cam face 15' of the succeeding cam lug 15. The mixing drum will cause rotation of the discharge chute in the direction of the arrow of Figure 3 until the cam face 15' of the stop lug 15 engages the roller on the lever 26 and lifts or rocks said lever out of its path. The stop lug 24 is carried by the lever 26 and will be swung downwardly into the path of the stop shoulder 15'' of the cam lug 15 limiting further rotation of the discharge chute. The stop lug 24 being operatively connected to the shaft 17 by the arm 18 and its associated link 18' will cause the shaft 17 to be reversedly rotated, moving the arm 20 to be latched by the control lever H and tensioning the operating spring 23. Also the cams 21 will be moved to release the spring levers 25 and the cam 22 will positively disengage the discharge chute carrying ring 14 from the face of the mixing drum.

While I have disclosed a rotary chute of the latter advanced type, it is to be understood that any of the conventional discharge chutes and associated power discharge mechanisms could be employed in substitution therefor to carry out my invention.

The measuring tank D and its associated three-way valve E are also of a known type and a detailed description is deemed unnecessary other than to say that the water measuring tank comprises means to variably measure predetermined quantities of water for concrete mixing purposes while the three-way valve, as shown in Figure 15, is adapted to control the discharge of water from the measuring tank D to the mixing drum, and the refilling action of the tank D.

The three-way valve is actuated by the valve lever E' which shifts the internal mechanism thereof to establish the communications between the mixing drum and the water measuring tank and between the water measuring tank and the water supply. Snap over springs E'' are provided for assisting in the movement of the lever E' and to retain it and the internal mechanism in tank filling or tank discharging position.

The controlling mechanism previously referred to which is adapted for cooperation with the discharge chute F, is actuated by a disc 26'' which is keyed to the cross shaft 2 constituting a pivot for the charging skip. This disc moves with the skip and the connected rod 31 thereof causes movement of the discs 29 and 30. These discs are keyed to a shaft 27 which is concentric with the shaft 28 on which the three-way valve controlling lever E' is keyed, but the shafts 27 and 28 are, however, entirely independent of each other. The disc 30 carries actuating pins 30' adjustably positioned in openings 30'' which pins are adapted to engage the lever E' to open or close the three-way valve E, depending on which direction the disc 30 is rotated. The disc 29 has pivoted thereto two rods 34 and 35 which lead respectively to the setting lever G' of the batchmeter G and to one of the actuating levers for the discharge chute control device M. This controlling device comprises a separable casing 36, as shown in Figures 6 and 7, and receives the usual discharge chute latching lever shaft 37 in one side thereof. This shaft 37 is conventional in the Winkler batchmeter Patent Number 1,451,483, and cooperates with the setting lever G' to be shifted to latching position as the internal mechanism of the batchmeter is shifted to start the mixing period.

At the end of such period the batchmeter actuates the shaft 37 to automatically shift it back to its initial position. Concentric with this shaft 37 and journaled in the opposite portion of the casing 36 is a shaft 38. This shaft 38 is connected to the rod 35 by the lever 35' to be actuated thereby when the skip is elevated. The shafts 37 and 38 constitute a trunnion upon which is loosely journaled the discharge chute controlling lever 39 for actuating the manual release lever H for the automatic rotary discharge chute F, as shown in Figures 3, 4 and 5. This lever 39 is provided with an enlarged hub portion 40 in which the notches 41 and 42 are located. The extremity of the lever 39 carries a roller 43 for actuating the slide rod 44. This slide rod is normally held in the full line position of Figure 6 by the spring 45 and is connected to the discharge chute manual control lever H by the link 46. The shafts 37 and 38 both have keyed thereto the short levers 47 and 48 upon the outer portions of which are pivoted the spring pressed pawls 49 and 50. These pawls are adapted to engage in the notches 41 and 42, as shown in Figure 6, and when the levers are actuated the extensions of the pawls will engage threaded abutment stops 51 and cause the pawls to be disengaged from the notches 41 and 42 whereupon the spring 45 will move the slide 44 and the lever 39 back to their initial positions.

The levers 47 and 48 carry the cams 52 which actuate the locking means for the skip hoist lever. This consists of a pivoted lever 53 supported in engagement with the hub portions of the levers 47 and 48 by the spring 54. Link 55 connects the free end of the lever 53 with an arm 56 which is secured to the short shaft 57. This shaft extends through and is journaled in the casing 36 and carries the arm 58 to which is secured the latch operating rod 59 for actuating the latch cam 60 to release the skip hoist manual control lever J. By providing the skip hoist lever J with a cam lug shown at 61 positioned so that the latch cam 60 may bear thereagainst, the lever J will be operated by upward movement of the latch cam 60 so as to throw in the clutch 10, initiating hoisting action of the skip, thereby obviating the necessity of manual operation at this point. The latch cam 60 cooperates with the hook member 62 in locking the lever J against operation.

In describing a cycle of operation of the machine, it will be necessary to assume that the drum is rotating with a batch of aggregates therein and that the discharge chute is in non-discharging position, the skip in its lowered position containing the necessary aggregates for the next batch of concrete, the water tank properly filled, and the three-way valve in closed position. This is somewhat diagrammatically illustrated in Figure 1 of the drawings.

At the end of the mixing period, the batchmeter "trips off," rotating the shaft 37 which actuates the lever 39 due to the interlocking of the pawl 49 in the notch 41. This moves the rod 44 actuating the manual control lever H to disengage the arm 20 therefrom, which causes the discharge chute to be automatically shifted from non-discharging position as heretofore described to discharging position.

As the lever 47 moves to the right, as shown in Figure 6 in dotted lines, the extension of the pawl 49 will strike one of the stops 51, kicking the pawl free of the notch 41. The spring 45 will thereupon return the lever 39 to full line position and the lever H to the position wherein it is engaged by arm 20 (Fig. 5), permitting the discharge chute to remain in said discharging position.

Simultaneously with the movement of the lever 47, the latch cam 60 will be disengaged from the hook member 62 of skip hoist lever J by reason of the cam 52 on lever 47 depressing the lever 53 which through the link 55 swings the arm 58 to raise the rod 59 and disengage the latch cam 60. The operator is now free to recharge the machine. Manual actuation of the lever J will engage the skip hoist clutch 10 causing rotation of the drum I which will wind up the cables 8 and 4, raising the skip. As the skip is raised the shaft 2 is rotated, causing the disc 26″ keyed thereto to move the rod 31 downwardly. This produces rotation of the disc 29 and shaft 27. The disc 30 which is keyed to this shaft moves its pins to cause the three-way valve control lever E′ to be actuated, moving the valve mechanism contained in the valve E to permit the measured quantity of water to be discharged into the mixing drum. Simultaneously with this action the rod 34 actuates the batchmeter setting lever G′ to set the time controlling mechanism thereof. The rod 35 actuates the lever 35′ to rotate the shaft 38. This swings the lever 48 causing actuation of the lever 39 as heretofore described, which in turn shifts the rod 44, causing the discharge chute to move to non-discharging position.

The lever 48 also carries a cam 52 which now engages the lever 53, preventing the same from rising to lock the skip hoist lever J. Upon the final upward charging movement of the skip the bracket 1 actuates the knockout rod J″ to move the manual control lever J to disengage the skip hoist clutch 10, also permitting the automatic application of the brake L. With the parts in this position and the lever J not locked, the operator is free to jiggle the skip to shake loose any of the aggregates that stick thereto. The operator by moving the lever J may also relieve tension on the brake means, permitting the skip to descend under the influence of gravity. The descending skip rotates the disc 26′ to the right (Fig. 1) which moves the rod 31 upwardly, rotating the discs 29 and 30 to the left (Fig. 1), which cause the batchmeter setting lever G′ to be returned to initial position and also the lever 48 within the control mechanism to be shifted to its initial position. The disc 30 which actuates the three-way valve lever E′ will under these conditions shift this lever to close the discharge from the tank to the mixing drum and open the communication between the tank and the water supply for refilling the same.

Under these conditions the parts will again be in the position as shown in Figure 6, both cams 52 being disengaged from the lever 53, permitting the spring 54 to support said lever to hold the latch cam 60 in engaged position with respect to the skip hoist lever J.

The latch shaft 37 of the batchmeter is positively held in latched position during the mixing period and due to the engagement of the pawl 49 carried, by the lever 47 which is keyed to this shaft 37, in the notch 41, the manual control lever H for the discharge chute will be locked against operation since the lever 39 is interlocked with the shaft 37, through the pawl 49 and notch 41. The other pawl 50 and notch 42 are of the usual type, permitting engagement in one direction only and automatically releasing when moved in the other direction. The casing M is of substantially liquid tight formation and may be partially filled with proper lubricant to insure free movement of the enclosed parts.

It is readily appreciable that by properly adjusting the latch cam 60, release and operation of the skip hoist lever may be caused to take place prior to the completion of the discharging action. This feature is highly desirable inasmuch as it provides for the overlapping of the upward movement of the skip with the discharge action and eliminates the wastage of time ordinarily entailed by the upward movement of the skip from a lowered to a charging position. With the latch cam 60 properly adjusted, upward movement of the skip will be initiated before the aggregates have been completely discharged. Such initiation is of course automatic, but it is well within the province of the invention to do away with the automatic phase at this point and manually start into operation the series of operations, much the same as is done in the Robb Patent, 1,370,497. However, when the automatic initiation of the hoisting of the skip is availed of, the overlapping of this action with that of the discharge action, is rendered automatic much the same as in the patent to Robb, 1,660,301.

Having thus described my invention, what I claim as new and desire to secure by Letters Patent of the United States, is:—

1. In a concrete mixing machine of the class described, the combination with a mixing drum and charging and discharging means therefor, of control instrumentalities for automatically causing the operation of both the said means, operative connections between the control instrumentalities and charging means whereby the operation of said control instrumentalities is rendered dependent on said charging means, and means associated with the charging means operable from the control instrumentalities for automatically initiating action of the charging means, said automatic means being movable out of operative position whereby operation of the charging means is rendered non-automatic.

2. In a concrete mixing machine of the class described, the combination with a mixing drum, charging and discharging means therefor, of a control device automatically moving the discharge means to discharging position, said control device also including means for governing action of the hoisting means whereby the latter is locked against hoisting action during mixing of a batch in the mixing drum, said last named means also including means which may be brought into operation if desired for automatically initiating operation of the charging means.

3. In a concrete mixing machine of the class described, a mixing drum and charging and discharging means therefor, of a control device for automatically moving the discharging means into discharging position, operative connections between the charging means and control device, whereby action of the control device is interlocked with and dependent on movement of the charging means, locking means associated with the charging means, and locking connections between the control device and locking means, whereby operation of the charging means is controlled by the controlling device, said locking device also constituting means for initiating action of the charging means.

4. In a paving machine of the class described, the combination with charging and discharging devices, of instrumentalities for permitting the overlapping of the movement of the charging means with discharge action of the discharging means and yet adjustable to prevent too early action of the charging means with respect to operation of the discharging means.

5. In a paving machine of the class described, the combination with a mixing drum and charging and discharging means therefor, of instrumentalities associated with said charging and discharging means and adjustable for permitting of the overlapping of their respective operations and yet positively preventing operation of the charging means to charge a drum with aggregates prior to the complete discharge of a mixed batch of aggregates therefrom.

6. A concrete mixing machine of the class described, comprising, in combination, a mixing drum, a loading skip, a discharge chute, a water measuring tank, a batchmeter and a control device associated with the batchmeter for automatically moving the discharge chute into discharging position upon the termination of the mixing period determined by the batchmeter, and including connections with the water measuring tank for causing entrance of water measured thereby into the drum at a predetermined time, also including a locking device for controlling operation of the charging means.

7. A concrete mixing machine of the class described, comprising, in combination, a mixing drum, a loading skip, a discharge chute, a water measuring tank, a batchmeter and a control device associated with the batchmeter for automatically moving the discharge chute into discharging position upon the termination of the mixing period determined by the batchmeter, and including connections with the water measuring tank for causing entrance of water measured thereby into the drum at a predetermined time, also including a locking device for controlling operation of the charging means, said charging means including means for rendering the same manually operable but under control of the locking means.

8. In a concrete mixing machine including a mixing drum, charging and discharging devices therefor, and an automatic device for controlling the operation of the charging and discharging devices, said automatic device being initiated into operation by the charging device to actuate the discharge device and thereafter lock the charging device against charging operation while a batch is being mixed and to automatically initiate hoisting action subsequent to the completion of the mixing period.

9. In a mixing machine, a mixing drum, a charging skip therefor, means for elevating said skip to charging position including a manually operable lever, knock-out means for said skip elevating means, holding means for said skip elevating means under control of said lever permitting lowering movement of the skip under manual control of the elevating means, a mixing period timing device associated with said charging skip to be set thereby provided with a movable part, a control device associated with said charging skip to be operated thereby, a discharging device for emptying the contents of said drum, and operative means between said movable part of the timing device and said discharging device to actuate said device to empty said drum.

10. In a mixing machine, a mixing device, a charging device therefor, a discharging device therefor, means for moving said charging device to charging and non-charging positions, means for moving said discharging device to discharging and non-discharging positions, and a control mechanism for the charging and discharging devices adapted to be actuated by the charging device, said control device being adapted to control in proper sequence the operations of said charging and discharging devices, and prevent unauthorized operation of the charging device during the mixing period.

11. In a mixing machine, a mixing drum, a charging skip, means to elevate said skip to discharge its contents into said drum and to lower the same, said means including a manually operable lever, latch means associated with said lever, a discharge device for emptying the contents of said drum, means for moving said discharge device selectively to discharging and non-discharging positions, a control device including a batchmeter, operative connections between said control device and said elevating means for the charging skip, said latch means and said discharge device, said control device being initiated into operation by said lever.

12. In a concrete mixing machine, a mixing drum, a charging skip for loading aggregates into the mixing drum, a discharge chute for emptying said drum, a water measuring device for delivering predetermined quantities of water to the drum, a control device for said discharging device governing the action thereof, connections between said charging skip, said water measuring device and control device to cause actuation thereof upon the charging operation, connections between the control device and the charging skip whereby upward movement of the latter is automatically initiated by the former, and means for manually initiating upward movement of the charging skip.

13. In a concrete mixing machine, in combination, a mixing drum, a charging device for charging aggregates into the drum, a discharge device for delivering prepared aggregates from the drum, a rotatable member intermediate the charging and discharge devices, a discharge control device, a connecting rod between the rotatable member and the discharge control device, and means between the charging device and the rotatable member whereby operation of the former causes effective operation of the latter.

14. A concrete mixing machine of the class described, comprising, in combination, a mixing drum, a charging skip therefor, a discharge chute for emptying the drum, a device for controlling the operation of the discharge chute, means for supplying water to the mixing drum, a rotatable member having operative connections with the discharge control device and the water supply means, and a rigid connection between the charging skip and the said rotatable member whereby hoisting action of the former causes effective operation of the latter.

15. A concrete mixing machine of the class described, comprising, in combination, a framework, a mixing drum rotatably mounted therein, a charging skip for the mixing drum pivotally mounted on the framework, a member mounted on the charging skip co-pivotally therewith, a discharge chute for the mixing drum, a control device for the discharge chute, a member pivotally mounted on the framework of the machine, a rigid connection between said last named member and the member carried by the charging skip whereby charging action of the latter causes effective operation of the former, a batchmeter, connections between the pivotally mounted member and the batchmeter, and a discharge control device whereby operation of said pivotally mounted member engendered by charging action of the skip, sets the batchmeter and operates the discharge control device to restore the discharge chute to non-discharging position.

16. In a concrete mixing machine of the class described, comprising, in combination, a mixing drum, a charging skip therefor, water supply means including a three-way valve, a circular member rotatably mounted and associated with the three-way valve, means carried by the rotatable member for operating the three-way valve, said means being adjustable to permit of operation of the rotatable member without entailing operation of the valve, and a connecting rod between the charging skip and the rotatable member whereby operation of the former causes rotation of the latter.

17. In concrete mixing apparatus of the class described, a control device for governing action of the discharge chute, comprising, in combination, a casing, a rod slidably mounted in said casing adapted to operate a discharge chute, a shaft pivoted at one side of the casing and connected with and operated by a batchmeter, a shaft pivoted on the other side of the casing and adapted to be operated incident to hoisting actions of a charging skip, a trunnion carried by one of said shafts, a hub mounted on said trunnion, an arm extending from said hub and engaging said discharge chute rod to actuate the latter, locking pawls for setting up a driving relation between the hub and said shafts, and means for engaging said pawls to discontinue the driving relationship between either one of said shafts and the said hub.

18. In concrete mixing apparatus of the class described, a control device for governing action of the discharge chute, comprising, in combination, a casing, a rod slidably mounted in said casing adapted to operate a discharge chute, a shaft pivoted at one side of the casing and connected with and operated by a batchmeter, a shaft pivoted on the other side of the casing and adapted to be operated incident to hoisting actions of a charging skip, a trunnion carried by one of said shafts, a hub mounted on said trunnion, an arm extending from said hub and engaging said discharge chute rod to actuate the latter, locking pawls for setting up a driving relation between the hub and said shafts, spring means normally holding the discharge chute rod in one position and effective to restore the said rod to that position when displaced therefrom, and means for engaging said pawls to discontinue the driving relationship between either one of said shafts and the said hub.

In testimony whereof I affix my signature.

GEORGE E. WEBB.